United States Patent [19]

Pennewiss et al.

[11] 4,290,925

[45] Sep. 22, 1981

[54] LUBRICATING OIL ADDITIVES

[75] Inventors: Horst Pennewiss, Darmstadt-Neu-Kranichstein; Rainer Benda, Rossdorf; Heinz Jost, Modautal; Helmuth Knoell, Lautertal, all of Fed. Rep. of Germany

[73] Assignee: Röhm GmbH, Darmstadt, Fed. Rep. of Germany

[21] Appl. No.: 116,449

[22] Filed: Jan. 29, 1980

[30] Foreign Application Priority Data

Feb. 16, 1979 [DE] Fed. Rep. of Germany ....... 2905954

[51] Int. Cl.$^3$ ........................ C10M 1/26; C10M 1/18; C10M 3/20; C10M 3/12
[52] U.S. Cl. ............................... 252/56 S; 252/56 R; 585/3; 585/12
[58] Field of Search ..................... 252/16, 56 S, 56 R; 585/3, 12

[56] References Cited

U.S. PATENT DOCUMENTS

| | | | |
|---|---|---|---|
| 2,992,987 | 7/1961 | Fields | 252/56 S |
| 3,509,056 | 4/1970 | Shepherd | 585/12 |
| 3,513,096 | 5/1970 | Brownawell et al. | 585/12 |
| 3,522,180 | 7/1970 | Sweeney et al. | 585/12 |
| 3,551,336 | 6/1969 | Jacobsson et al. | 585/12 |
| 3,681,302 | 8/1972 | Sweeney | 585/12 |
| 3,790,480 | 2/1974 | Campbell et al. | 585/12 |

FOREIGN PATENT DOCUMENTS

| | | | |
|---|---|---|---|
| 870329 | 1/1979 | Belgium . | |
| 947186 | 8/1956 | Fed. Rep. of Germany | 252/56 S |
| 1003896 | 8/1957 | Fed. Rep. of Germany | 252/56 S |
| 1058739 | 6/1959 | Fed. Rep. of Germany | 252/56 S |
| 1235491 | 3/1967 | Fed. Rep. of Germany | 585/3 |
| 1963039 | 8/1970 | Fed. Rep. of Germany | 585/12 |
| 1913857 | 10/1970 | Fed. Rep. of Germany . | |
| 1939037 | 1/1971 | Fed. Rep. of Germany | 585/12 |
| 1644941 | 5/1971 | Fed. Rep. of Germany | 585/12 |
| 2059981 | 6/1971 | Fed. Rep. of Germany | 585/12 |
| 1769834 | 10/1971 | Fed. Rep. of Germany | 585/12 |
| 2106528 | 8/1972 | Fed. Rep. of Germany . | |
| 2363792 | 7/1974 | Fed. Rep. of Germany | 585/3 |
| 1745359 | 2/1977 | Fed. Rep. of Germany | 252/56 S |
| 2740449 | 3/1979 | Fed. Rep. of Germany | 252/56 |
| 2049799 | 3/1971 | France . | |

OTHER PUBLICATIONS

Japanese Patent Application 50-111,138 (German translation) Sep. 1, 1975.

*Primary Examiner*—Delbert E. Gantz
*Assistant Examiner*—Irving Vaughn
*Attorney, Agent, or Firm*—Curtis, Morris & Safford

[57] ABSTRACT

What is disclosed is a concentrated polymer emulsion useful as a lubricating oil additive for improving the viscosity index thereof, said emulsion comprising:

(1) a dispersed phase of an olefinic copolymer having a molecular weight complementary with respect to the thickening effect desired;

(2) a dispersing phase of a polymer predominantly comprising at least one member selected from the group consisting of acrylate ester and methacrylate ester monomers;

(3) a vehicle which is a good solvent for the esters in said dispersing phase and a substantially less good solvent for the olefinic copolymer by virtue of the esters dissolved in said vehicle; and (4) an emulsifier, stabilizing phase distribution, which is a member selected from the group consisting of graft copolymers and block copolymers formed from olefinic monomers and at least one member selected from the group consisting of acrylate ester and methacrylate ester monomers.

11 Claims, No Drawings

LUBRICATING OIL ADDITIVES

The present invention relates to concentrated polymer emulsions useful as lubricating oil additives.

More in particular, the emulsions of the invention comprise an olefinic copolymer dispersed in a continuous phase of an acrylate or methacrylate homopolymer or copolymer, a vehicle for said polymers and/or copolymers, and a polymeric stabilizer for said emulsions.

Lubricating oil additives comprising oil-soluble polymers which improve the viscosity-temperature behavior of multifunctional mineral oils (VI-improvers) are used on a large technical scale. In addition to the thickening effect, polymers which come into consideration for this use are also expected to have an adequate shear stability. Furthermore the polymers should, if possible, lower the pour point of the mineral oil and exert a dispersant or detergent effect on the cold sludge which is formed on, and the dirt which is deposited in, the engine.

Two classes of polymer are principally used for the above purposes: lubricating oil additives comprising certain acrylate and methacrylate homopolymers and copolymers, commonly polymethacrylates, and those comprising olefinic copolymers (OCP's), particularly ethylene-propylene copolymers. Both classes of product have advantages and disadvantages. Polyolefins show an excellent thickening effect, but have no pour-point depressant action so that they require the addition of pour-point improvers. However, in the case of certain polymers, particularly those which tend to form associates, the addition of pour-point improvers leads to difficulties. Polymethacrylates are characterized by a good effect with respect to the viscosity-temperature behavior of the oils to which they are added as improvers, and when used in sufficiently high concentration they also show an outstanding protective effect against wear. Their pour-point lowering effect should also be stressed.

The idea of combining products of both classes of polymers, in order thereby to produce lubricating oil additives with improved properties, was obvious. Industry awaits the preparation of lubricating oil additives in a liquid (oil-based) form and with the highest possible absolute polymer content.

No noticeable difficulties arise as long as only a small proportion (a maximum of about 5% by weight, calculated on the total polymer content) of polymers of one class is combined with a predominant proportion of the other class, possibly by mixing the solutions of the two products together in oil. To ensure an optimum composition, it seems desirable to increase the amount of the polymer class added in a minor proportion to considerably above 5% by weight while at the same time maintaining, if possible, the properties assuring the technical success of the individual components, such as composition, molecular weight, etc. However, when a polymethacrylate solution in mineral oil is admixed with polyolefins above the limit mentioned as a guide, the incompatibility of the two polymer classes will make itself manifest: a phase separation of the polymers takes place which, on sufficiently long storage, can lead to layer formation. To prevent such separation phenomena, which show the product to be useless for most processing, it has already been proposed to make polyolefins and polymethacrylates compatible by polymerizing the methacrylic acid esters—which, as is known, are those esters having a $C_8$–$C_{18}$ alcohol moiety—in the solution of the polyolefin in oil. It is known in the art that the methacrylate in part undergoes graft polymerization onto the polyolefin.

It has also been proposed in the art to solve the aforementioned problem through a combination of mutually compatible polymeric additives. This method includes the combination of a copolymer comprising units of $C_4$–$C_{22}$n-alkyl methacrylates and optionally either dialkylaminoalkyl methacrylate units or N-(alkanone)-acrylamide units, which copolymer has a number-average molecular weight ($\overline{M}_n$) of about $3(10^4)$ to $12(10^4)$, as a pour-point depressant, with a VI-improver consisting of an ethylene-propylene copolymer having a molecular weight of about $10^4$ to $10^5$, an $\overline{M}_w/\overline{M}_n$ ratio of less than 5, and a proportion of propylene units of from 40 to 70%.

According to still other prior art, stable polymer dispersions are obtained by the solution polymerization of, for example, butyl acrylate and methyl methacrylate in the presence of hydrogenated polybutadiene or a cyclopentadiene-ethylene-propylene rubber.

However, the problem of producing combinations of olefinic copolymers with polymethacrylates, which combinations combine the desirable properties of both polymer classes and are available in a form which meets commercial and industrial requirements, has not been solved in a satisfactory manner.

If possible, such commercially available forms should not have a polymer content of less than 30%. In view of the urgent technical requirement of imparting a high wear resistance to lubricating oils, particularly those used in high-speed motors, the products should have a polymer component consisting of from 50 to 80% by weight of methacrylate units and from 50 to 20% by weight of an olefinic homopolymer or copolymer.

In the desired concentrations, solutions of acrylate and methacrylate polymers are relatively viscous and OCP solutions are also highly viscous. Hence, a priori, there seemed to be no prospect of obtaining combinations of the two classes of products which exhibit a technically useful viscosity.

A feature of the present invention is a method for preparing concentrated polymer emulsions of outstanding technical usefulness, which emulsions contain olefinic copolymers and acrylate and/or methacrylate polymers at the same time, and in which the olefinic copolymer portion, which mainly contributes to the viscosity of the mixtures, is emulsified by the acrylate or methacrylate polymer phase serving as the continuous phase. Another feature is the polymer emulsions themselves.

Experience has shown that the conditions must be so chosen that at no time does the dispersed phase containing the olefinic copolymer pass into the continuous phase, since otherwise it is impossible to avoid high viscosities or gelling phenomena. On further dilution with mineral oil, the tendency to phase separation, which ultimately renders the products useless, becomes increasingly noticeable. Hence it is necessary to solve two problems in particular: gelling of the concentrates on dilution must be avoided and phase separation at even lower concentrations must be prevented.

A relatively effective approach to solving these problems consisting in the addition of stabilizers to stabilize the phase system once it has formed. Graft- or block-polymers containing portions of both polymer classes are suitable for this purpose. However, it is generally advisable to add these stabilizers only in amounts which ensure stabilization in concentrated form. Thus, when, for example because of technical considerations, the particularly favorable olefinic copolymers having an especially good thickening effect are used, the addition of a relatively large proportion of graft polymers as stabilizers reduces their effectiveness as VI-improvers.

It has now been found that polymer emulsions which comprise acrylate and/or methacrylate polymers and olefinic copolymers in liquid vehicles for use as oil additives, and which retain the characteristics of the existing disperse system when subsequently diluted with oil to a polymer content of as low as about 10%, can be obtained if said emulsions contain: (1) an acrylate and-/or methacrylate polymer having a defined low molecular-weight range as the continuous phase; (2) an olefinic copolymer having a molecular weight complementary with respect to the thickening effect as the dispersed phase; (3) a vehicle which acts as a good solvent for the acrylic acid or methacrylic acid esters and as a substantially less good solvent (even a precipitant) for the olefinic copolymers because of the acrylic or methacrylic acid ester dissolved in the vehicle; and (4) a graft- and/or block polymer of olefinic copolymers and acrylic or methacrylic acid esters as a phase-distribution stabilizer.

THE DISPERSED PHASE

The olefinic copolymers to be used in accordance with the invention are known in the art. They include primarily the copolymers composed of ethylene, propylene, butylene and/or isobutylene. Such olefinic copolymers are described e.g. in German Offenlegungsschriften Nos. 1,644,941; 1,769,834; 1,939,037; 1,963,039; and 2,059,981.

Ethylene-propylene copolymers are preferred; terpolymers with the addition of known ter-components such as ethylidene-norbornene may also be used, but their tendency to cross-linking during the aging process must be reckoned with. The distribution can be largely statistical, but sequence polymers with ethylene blocks can also be advantageously used. The proportion of the ethylene/propylene monomers can be varied within certain limits, which may be set at about 75% for ethylene and about 80% for propylene as upper limits. Because of its reduced tendency to dissolve in oil, polypropylene is already less suitable than are ethylene-propylene copolymers.

THE DISPERSING PHASE

The polymethacrylates preferred to be used as the continuous phase are also known polymers, composed of methacrylic acid esters whose alcohol moiety, preferably an alkanol moiety, contains from 6 to 22 C atoms, preferably from 8 to 18 C atoms, and optionally also of minor amounts of additional monomers which copolymerize with the aforementioned methacrylic acid esters. The monomers to be added in minor amounts, generally in amounts of less than 10% by weight, may include, for example, monomers with polar groups, in particular suitable polymerizable heterocyclic compounds, which are known to be capable of contributing a dispersant and detergent effect to the VI-improving, pour-point lowering, and wear-protecting action of the basic polymers. Such monomers or copolymers with acrylates or methacrylates are part of the teachings of, for example, German Pat. No. 947,186; German Pat. No. 1,003,896; German Auslegeschrift No. 1,058,739; and German Pat. No. 1,745,359. Graft copolymers of polyolefins with polymerizable nitrogen-containing compounds, particularly heterocyclic compounds having a dispersant effect in addition to the VI-improving action, are proposed in German Auslegeschrift No. 1,235,491.

Particular mention should be made of vinyl pyridine, vinyl pyrrolidine, vinyl pyrrolidone, and vinyl imidazole, as well as derivatives thereof, especially the alkylated heterocyclic compounds of this type, as heterocyclic monomers for copolymerization with the aforementioned methacrylic acid esters. Advantageously, these heterocyclic monomers may also be used in combination.

In addition, like the methacrylates, polyacrylates having 8 to 20 carbon atoms in the alcohol portion, preferably an alkanol moiety, can be used. They also can be modified by copolymerization with suitable monomers as described above.

Further, copolymers of methacrylic acid esters of the kind described above with acrylic esters—particularly those having 1 to 8 carbon atoms in the alcohol (preferably alkanol) portion—are of special interest. As a rule the amount of acrylic acid ester in the copolymer is less than 10 percent by weight. Also, the further comonomers already described can be used in such copolymers.

In general, the acrylate/methacrylate dispersing phase is from 40 to 95 percent by weight of the total amount of polymer present, inclusive of the polymeric stabilizing agents discussed immediately below, while the olefin copolymer dispersed therein is from 5 to 60 percent by weight of this total amount of polymer.

THE VEHICLE

The vehicle, which is also of decisive importance for the quality of the polymer emulsion to be prepared in accordance with the invention, is defined by the requirement that it must act as a good solvent for the (meth)acrylic acid esters, but as a substantially less good solvent (even a precipitant) for the olefinic copolymers. Moreover it must naturally be inert and unobjectionable on the whole. Vehicles satisfying the above conditions are, for example, esters and/or higher alcohols. They are used mostly in a mixture with mineral oils, and in special cases even by themselves. In general, the types of compounds which come into consideration as vehicles contain more than 8 C. atoms per molecule.

In the group of esters, particular emphasis is placed on phosphoric acid esters, esters of dicarboxylic acids, esters of monocarboxylic acids with diols or polyalkylene glycols, esters of neopentylpolyols with monocarboxylic acids (cf. Ullman's "Enzyklopadie der Technischen Chemie" [Encyclopedia of Industrial Chemistry], 3rd edition, Vol. 15, pp. 287–292, Urban & Schwarzenberg (1964). Suitable esters of dicarboxylic acids are the esters of phthalic acid, particularly the phthalic acid esters of $C_4$ to $C_8$ alcohols, with special mention of dibutyl phthalate and dioctyl phthalate, as well as the esters of aliphatic dicarboxylic acids, especially the esters of straight-chain dicarboxylic acids with branched-chain primary alcohols. Particular emphasis is placed on esters of sebacic, adipic, and azelaic acid, with special mention of the 2-ethylhexyl esters, isooctyl-3,5,5-trimethylhexyl esters, and the esters with $C_8$-, $C_9$- and $C_{10}$-oxo-alcohols.

Of particular importance are esters of straight-chain primary alcohols with branched-chain dicarboxylic acids. Cited as examples are alkyl-substituted adipic acids, e.g. 2,2,4-trimethyladipic acid.

As suitable alcohol components, the aforementioned oxo-alcohols are advantageously used, for example. Among the esters of monocarboxylic acids with diols or polyalkylene glycols, particular mention is made of the diesters with diethylene glycol, triethylene glycol, tetraethylene glycol to decamethylene glycol, and dipropylene glycol as the alcohol components. Of the monocarboxylic acids, specific mention is made of propionic acid, (iso)butyric acid, and pelargonic acid, e.g. dipropylene glycol dipelargonate, diethylene glycol dipropionate and di-isobutyrate, as well as of the corresponding esters of triethylene glycol and of tetraethylene glycol di-2-ethylhexanoic acid ester.

It should be mentioned that mixtures of the abovementioned solvents may also come into consideration for use as a vehicle.

In general, the proportion of the vehicle in the concentrated polymer emulsion is from 80 to 25% by weight, preferably less than 70%, and especially between 60 to 40% by weight.

The mineral oil constituting the principal amount of the vehicle for the concentrated polymer solutions in accordance with the present invention meets the usual specifications for engine oils. As a rule, it has viscosity values $\eta_{100°\ C.}$ of between 3.5 and 6.5 mm$^2$/s. In principle, the technical methods for the preparation of the emulsions according to the present inventon make use of conventional polymerization processes. This applies, in particular, also to the use of initiators, adherence to boundary conditions, and the like.

THE STABILIZERS

The technical applicability of the concentrated polymer emulsions according to the invention depends, to a not inconsiderable extent, on the agents (emulsifiers) by which the phase distribution is stabilized.

The emulsifiers or stabilizers suitable for use in accordance with the invention include both graft- and blockpolymers. To possess the desired emulsifying effect, the graft- or block-polymers should have sequences compatible with the acrylate or methacrylate polymer, on the one hand, and sequences compatible with the olefinic copolymer, on the other.

As a rule, the molecular weights of these sequences (individual branches) are equal to or greater than the molecular weight of the respective polymer with which compatibility is to be established.

In general, the amount of graft- and/or blockpolymer required for stabilization will not be less than 5 percent and may be as much as 100 percent, by weight of the total polymer. Methods for preparing suitable graft polymers are known per se. Thus the grafting may be carried out by the transfer method, for example, or a suitable base polymer having functional groups may be reacted with a suitable polymer containing complementary functional groups, too.

One method for preparing suitable block polymers consists in anionic polymerization, for example. In this case the process may be carried out, for example, by polymerizing isoprene or butadiene with a suitable anionic initiator (e.g. an organometallic compound) and reacting the "living" anionic chain ends with, for example, an alkyl methacrylate. The polymers prepared in this manner are then hydrogenated under conditions such that the ester group is not attacked. For details of the preparation of block- and graft-copolymers, reference is made to the pertinent literature, e.g. Houben-Weyl, "Methoden der Org. Chemie" [Methods of Organic Chemistry], 14/1, p. 110 ff; "Block Copolymers," D. C. Allport, W. H. Janes, Appl. Sci, Publishers, London, 1973; "Graft Copolymers," H. A. J. Battaerd, G. W. Tregear, Polymer Reviews, Vol. 16 (1967); and "Block and Graft Polymers," W. J. Burlant, A. S. Hoffman, Reinhold Publishing Corp., New York, 1960.

Several alternatives are available for the technical procedure to be followed. For example, the stabilizer may be advantageously produced "in situ" by graft polymerization. Generally, in this case at least a portion of the (previously prepared) olefinic copolymer (OCP) in a suitable amount of mineral oil is placed in a polymerization vessel. The highest proportion of graft polymer is obtained when the entire amount of OCP is used.

To prepare the graft polymers, it is possible to begin with a certain portion of the total polyolefin, e.g. of the order of from 40 to 50% by weight. In this case, a concentration of 10% by weight in mineral oil may be taken as a guide. The solution, placed in a suitable polymerization vessel, is then treated with the monomeric components, e.g. the methacrylic acid ester of a $C_{12}$–$C_{18}$ alcohol mixture, together with one or more suitable initiators.

Alternative methods are available also for the introduction of polymerizable heterocyclic monomers. Thus, at the end of a one-stage process (polymerization in the presence of the entire amount of OCP by addition of the methacrylate monomer), the heterocyclic monomers may be added on by graft polymerization as a final operation. In this case, vinyl imidazole and/or N-vinyl pyrrolidone are particularly preferred. When the process is carried out in several stages, the polymerizable heterocyclic monomers may be added before or after the second OCP incorporation, for example. The preparation of an additional portion grafted onto OCP also has its advantages.

Another possibility is to copolymerize the polymerizable heterocyclic compounds simultaneously with the methacrylate component.

The polymers in oil, prepared according to the above specifications, are used as the substrate in the decisive step of preparing concentrated emulsions with a stable phase structure, viz. through the addition of the vehicle which acts as a good solvent for the acrylate of methacrylate polymer but as a substantially less good solvent for the olefinic copolymer, owing to the polyalkyl acrylate or methacrylate content of said vehicle. However, it is also possible to operate from the very start in the presence of portions or the entire amount of the vehicle.

Common to all vehicles is their poor solvent action for OCP. For reference purposes it may be stated that suitable vehicles which keep the acrylate or methacrylate polymer in solution generally dissolve OCP to an extent of less than 5% by weight, and in most cases less than 2% by weight.

A better understanding of the present invention will be had by referring to the following specific examples, given by way of illustration.

In the Examples, the degree of inhomogeneity of certain polymers is reported by the measure "U". U is defined as $(\overline{M}_w/\overline{M}_n)-1$, where $\overline{M}_w$ and $\overline{M}_n$ are the weight-average molecular weight and number-average molecular weights, respectively, of the polymers in question.

Similarly, the "SSI" or shear stability index, a measure of the shear stability of a polymer, is reported as a percentage loss of thickening effect as determined by the shear stability test according to DIN 51382.

In the Examples, those viscosity values marked with an asterisk refer to the concentrated polymer emulsion as present in each individual case.

EXAMPLE 1

The following mixture is charged to a 2-liter four-necked flask equipped with stirrer, thermometer, reflux condenser and feed tube:
 765 g of mineral oil ($\eta_{100°\,C.}$=5.3 mm²/s);
 85 g of ethylene-propylene copolymer
  [72% of ethylene; $\overline{M}_w$=100,000; U=0.8; SSI (1% in mineral oil)=22];
 94.5 g of the methacrylic acid ester of a $C_{12}$–$C_{18}$ alcohol mixture; and
 1.5 g of tert.-butyl peroctoate.

After dissolution of the components, the following mixture is added at 98° C. at a uniform rate over a period of 3.5 hours;
 387.5 g of the methacrylic acid ester of a $C_{12}$–$C_{18}$ alcohol mixture; and
 6.6 g of a tert.-butyl peroctoate.

Two hours after the end of the addition, a further quantity of 0.96 g of tert.-butyl peroctoate is added. Total polymerization time: 8 hours. The polyalkyl methacrylate formed has a weight-average molecular weight ($\overline{M}_w$) of about 70,000 at U$\approx$1 (determination by gel permeation chromatography) and is thus practically shear-stable according to DIN 51382.

To this product is then added
 133.2 g of ethylene-propylene copolymer
  [72% ethylene; $\overline{M}_w$=100,000 U=0.8; SSI (1% in mineral oil)=22].

After dissolution at 100° C., the following are added over an 8-hour period:
 21.9 g of N-vinyl pyrrolidone;
 7.3 g of N-vinyl imidazole; and
 1.8 g of tert.-butyl perbenzoate.

Grafting is then carried out at 130° C., with an additional 0.87 g of tert.-butyl perbenzoate added after 1 hour and 2 hours, respectively. Total duration of grafting: 6 hours. A turbid, viscous emulsion is obtained.

Polymer content of the emulsion=48.7% by weight.
Viscosity (100° C. 48.7% by weight)=9000 mm²/s
Viscosity (100° C., 5%* in mineral oil of $\eta_{100°\,C.}$=5.3 mm²/s)=12.2 mm²/s
SSI (5%* in mineral oil of $\eta_{100°\,C.}$=5.3 mm²/s)=23
Nitrogen content of the isolated polymer=0.40% by weight.

After dilution of the 48.7% emulsion with mineral oil ($\eta_{100°\,C.}$=4.1 mm²/s) to a polymer content of 40% by weight:
Viscosity (100° C., 40%)=3800 mm²/s.

After dilution of the 48.7% emulsion with the diester of 2,2,4-trimethyladipic acid with a $C_8$–$C_{10}$ alcohol mixture ($\eta_{100°\,C.}$=3.3 mm²/s) to a polymer content of 40% by weight:
Viscosity (100° C., 40%)=2700 mm²/s.

Since ester oil is a nonsolvent for OCP, the dilution leads to de-swelling of the dispersed OCP phase and thus to a greater decrease in viscosity than in the case of a corresponding dilution with mineral oil. The required two-phase state can be well recognized under a phase-contrast microscope. The dark, dispersed OCP particles have a diameter from 1 to 20$\mu$.

A better understanding of the foregoing Example may be had from the following description of the various materials employed in the Example, their function, and their ultimate destiny in the product prepared.

Thus, the mineral oil employed is a component of the carrier or vehicle. The ethylene-propylene copolymer principally forms the dispersed phase after the polymerization steps which are recited. The methacrylic acid ester, both that present in the initial charge and that subsequently added, principally forms the continuous phase after polymerization.

During polymerization, a portion of the methacrylic ester is graft copolymerized on the olefin copolymer (OCP) backbone. According to experience, of the OCP originally used about 30 to 50 percent by weight is found to be graft copolymerized with polymethacrylate chains. This graft copolymer is the emulsifier which is necessary for stabilization of the two-phase system. The stabilizer is believed to be dispersed with its methacrylate function in the continuous phase and with its OCP function in the dispersed phase.

This Example, further, shows the separate addition and emulsification of further OCP in order to increase the OCP content in the emulsion.

This Example also illustrates the graft copolymerization of optional monomers having polar groups, such as the N-vinyl compounds specifically mentioned in the Example. The graft copolymerization of these monomers extends in part to the dispersed phase and in part to the continuous phase.

Finally, the addition of an ester oil after the polymerization is to effect a dilution while at the same time de-swelling the dispersed OCP phase. The ester oil is principally present in the continuous phase and only present in small amounts in the dispersed phase.

EXAMPLE 2

The following mixture is charged to a 2-liter four-necked flask equipped with a stirrer, thermometer, reflux condenser, and feed tube:
 76.6 g of ethylene-propylene copolymer
  [72% ethylene; $\overline{M}_w$=100,000; U=0.8; SSI (1% in mineral oil)=22];
 689.4 g of mineral oil ($\eta_{100°\,C.}$=5.3 mm²/s);
 85.0 g of methacrylic acid ester of a $C_{12}$–$C_{18}$ alcohol mixture; and
 1.38 g of tert.-butyl peroctoate.

After dissolution of the components, the following mixture is added at 98° C. at a uniform rate over a period of 3.5 hours:
 350 g of methacrylic acid ester of a $C_{12}$–$C_{18}$ alcohol mixture; and
 5.95 g of tert.-butyl peroctoate.

Two hours after the end of the addition, a further quantity of 0.87 g of tert.-butyl peroctoate is added. Total polymerization time: 10 hours. The polyalkyl methacrylate formed has a molecular weight $\overline{M}_w$ of about 70,000 at an inhomogeneity (U) of approximately 1 (determination by GCP), and is thus practically shear-stable according to DIN 51382.

To this product is then added
 111.6 g of ethylene-propylene copolymer
  [72% ethylene; $\overline{M}_w$=200,000; U=0.7; SSI (1% in mineral oil)=53].

Dissolution takes place over an 8-hour period at 100° C.
Polymer content of the emulsion=47.4% by weight.
Viscosity (100° C., 47.4%)=1400 mm²/s
Viscosity (100° C., 5%* in mineral oil of $\eta_{100°\,C.}$=5.3 mm²/s)=13.5 mm²/s
SSI (5%* in mineral oil)=40

After dilution of the 47.4% emulsion with mineral oil ($\eta_{100°\,C.}$=5.3 mm²/s) to a polymer content of 40%:

Viscosity (100° C., 40%)=1400 mm²/s.

After dilution of the 47.4% emulsion with phthalic acid dibutyl ester ($\eta_{100° C.}$=2.3 mm²/s) to a polymer content of 40%:

Viscosity (100° C., 40%)=650 mm²/s.

In this case the dilution with mineral oil to a polymer content of 40% does not lead to a viscosity reduction because the latter is exactly compensated by the more intensive swelling of the dispersed OCP phase.

The various components present in this Example play the same role which they play in Example 1. Again, additional OCP is added to increase the quantity of dispersed phase. However, in this Example, the additional graft copolymerization of polar monomers is absent.

EXAMPLE 3

The following mixture is placed in a 4-liter four-necked flask equipped with stirrer, thermometer, reflux condenser and feed tube:

1577.5 g of mineral oil ($\eta_{100° C.}$=5.3 mm²/s); and
426.5 g of ethylene-propylene copolymer
 [72% ethylene; $\overline{M}_w$=100,000; U=0.8; SSI (1% in mineral oil)=22].

After dissolution at 100° C. over an 8-hour period the following mixture is added:

426.5 g of the methacrylic acid ester of a $C_{12}$–$C_{18}$ alcohol mixture; and
3.25 g of tert.-butyl peroctoate.

The following mixture is then added at 98° C. at a uniform rate over a period of 3.5 hours:

569.0 g of methacrylic acid ester of a $C_{12}$–$C_{18}$ mixture; and
9.7 g of tert.-butyl peroctoate.

Two hours after the end of the addition a further quantity of 2.2 g of tert.-butyl peroctoate is added. Total polymerization time: 10 hours. The polyalkyl methacrylate formed has a molecular weight $\overline{M}_w$ of approximately 70,000 at U≈1 (determination by gel permeation chromatography), and is therefore practically shear-stable according to DIN 51382.

The following mixture is then added:
44.6 g of N-vinyl pyrrolidone
14.9 g of N-vinyl imidazole
3.70 g of tert.-butyl perbenzoate.

The grafting is carried out at 130° C., with an additional 1.79 g of tert.-butyl perbenzoate added after 1 hour and 2 hours, respectively. Total duration of grafting: 8 hours. A turbid, viscous emulsion is obtained.

Polymer content of the emulsion=48.8% by weight.
Viscosity (100° C. 48.8%)=22,000 mm²/s
Viscosity (100° C., 5%* in mineral oil of $\eta_{100° C.}$=5.3 mm²/s) 11.4 mm²/s
SSI (5%* in mineral oil of $\eta_{100° C.}$=5.3 mm²/s)=23
Nitrogen content of the isolated polymer: 0.40% by weight.

After dilution of the 48.8% emulsion with mineral oil ($\eta_{100° C.}$=5.3 mm²/s) to a polymer content of 40%:
Viscosity (100° C., 40%)=6400 mm²/s.

After dilution of the 48.8% emulsion with phosphoric acid tributyl ester to a polymer content of 40%:
Viscosity (100° C., 40%)=4000 mm²/s.

The various components fulfill the same role in this Example as in Example 1. In this Example, there is no further addition of OCP other than that present in the initial charge.

EXAMPLE 4

The apparatus and mode of operation are the same as in Example 1.
Initial mixture:
 689.4 g of mineral oil ($\eta_{100° C.}$=5.3 mm²/s);
 76.6 g of ethylene-propylene copolymer
  [50% ethylene; $\overline{M}_w$=95,000; U=0.8; SSI (1% in mineral oil)=25];
 84.0 g of methacrylic acid ester of a $C_{12}$–$C_{18}$ alcohol mixture; and
 1.3 g of tert.-butyl peroctoate.

The following are then added at 90° C.:
 350.0 g of the methacrylic acid ester of a $C_{12}$–$C_{18}$ alcohol mixture; and
 2.2 g of tert.-butyl peroctoate.

An additional 0.87 g of tert.-butyl peroctoate is added.

After polymerization there is addition of:
 120 g of ethylene-propylene copolymer
  [72% ethylene; $\overline{M}_w$=92,000; U=0.9; SSI (1% in mineral oil)=20];

This is followed by addition of:
 18.9 g of N-vinyl pyrrolidone;
 6.3 g of N-vinyl imidazole; and
 1.5 g of perbenzoate.

Grafting at 130° C. and addition of a further quantity of 0.7 g of tert.-butyl perbenzoate.

Polymer content of the emulsion=48.8% by weight.
Viscosity (100° C., 48.8%)=10,700 mm²/s
Viscosity (100° C., 5%* in mineral oil of $\eta_{100° C.}$=5.3 mm²/s)=12.75 mm²/s
SSI (5%* in mineral oil)=23
Nitrogen content of the isolated polymer: 0.38% by weight.

The various components employed in the Example play the same roles as earlier described.

EXAMPLE 5

The mode of operation and apparatus are the same as in Example 3, except that a 2-liter four-necked flask was used.
Initial mixture:
 631.0 g of mineral oil ($\eta_{100° C.}$=5.3 mm²/s);
 170.0 g of ethylene-propylene copolymer
  [50% ethylene; $\overline{M}_w$=95,000; U=0.8: SSI (1% in mineral oil)=25];
 170.6 g of the methacrylic acid ester of a $C_{12}$–$C_{18}$ alcohol mixture; and
 0.87 g of tert.-butyl peroctoate.

Thereupon addition, at 90° C., of:
 230 g of the methacrylic acid ester of a $C_{12}$–$C_{18}$ alcohol mixture; and
 1.4 g of tert.-butyl peroctoate.

An additional 0.8 g of tert.-butyl peroctoate is added. Total polymerization time: 10 hours.

Polymer content of the emulsion=47.6% by weight.
Viscosity (100° C., 47.6%)=4650 mm²/s
Viscosity (100° C., 5%* in mineral oil of $\eta_{100° C.}$=5.3 mm²/s)=11.2 mm²/s
SSI (5%* in mineral oil)=20

This Example is illustrative of the use of a separately-prepared emulsifier for the emulsification of OCP in a dispersing phase, as contrasted with the preparation of the emulsifier in situ. Examples 6 and 7 which follow also show the use of a separately-formed emulsifier. Such a technique permits an increase in the content of the continuous phase by the addition to the emulsion of separately-formed polymethacrylate in mineral oil.

EXAMPLE 6

In this Example, the product obtained according to Example 5, comprising a large proportion of graft copolymer of methacrylate on OCP, is used per se as a graft copolymeric emulsifying agent for the dispersion of an ethylene-propylene copolymer in a 55 weight percent solution of a poly-$C_{12}$-$C_{18}$-alkyl methacrylate ($\overline{M}$ =60,000) in mineral oil.

The following components are thoroughly mixed at 100° C.:
  200 g of poly-$C_{12}$-$C_{18}$-alkyl methacrylate (55% in mineral oil, $\overline{M}$ =60,000);
  64.8 g of dibutyl phthalate;
  20.0 g of mineral oil ($\eta_{100°\,C.}$=5.3 mm$^2$/s);
  33.6 g of emulsifier according to Example 5; and
  49.0 g of ethylene-propylene copolymer
    [72% ethylene; $\overline{M}_w$=100,000; SSI=22].
A turbid, viscous emulsion is obtained.
  Polymer content: 47.6% by weight
  Viscosity (100° C., 47.6%)=4200 mm$^2$/s
  Viscosity (100° C., 10%* in mineral oil of $\eta_{100°\,C.}$=5.3 mm$^2$/s)=19.0 mm$^2$/s
  SSI (5%* in mineral oil)=18.

EXAMPLE 7

The same process is used as in Example 6 except that a 47.6% solution, in mineral oil, of a copolymer of 90% decyl methacrylate and 10% of a poly-1,4-butadiene ($\overline{M}_w$=10,000; U=0.4) having a methacryl end group is used as the emulsifier. The double bonds of the polybutadiene in the copolymer with decyl methacrylate are hydrogenated to an extent of more than 95%. The molecular weight of the copolymer is $\overline{M}_w$=200,000 at U=1.2.
A turbid, viscous emulsion is obtained.
  Polymer content=47.6% by weight.
  Viscosity (100° C., 47.6%)=3900 mm$^2$/s
  Viscosity (10%* in mineral oil of $\eta_{100°\,C.}$=5.3 mm$^2$/s)=20.1 mm$^2$/s
  SSI (5%* in mineral oil)=20.

EXAMPLE 8

The same process is used as in Example 6, except that a 47.6% solution, in mineral oil, of an anionically prepared block copolymer of 50% by weight of isoprene and 50% by weight of decyl methacrylate ($\overline{M}_w$=200,000, U=0.3) is used as the emulsifier. The polyisoprene-1,4-block is hydrogenated to an extent of over 95%.
A turbid, viscous emulsion is obtained.
  Polymer content=47.6% by weight.
  Viscosity (100° C., 47.6%)=4100 mm$^2$/s
  Viscosity (100° C., 10%* in mineral oil of $\eta_{100°\,C.}$=5.3 mm$^2$/s)=20.5 mm$^2$/s
  SSI (5%* in mineral oil)=20.

EXAMPLE 9

The apparatus and mode of operation were the same as in Example 3 except that a 5-liter four-necked flask was used. Initial mixture:
  2524 g of mineral oil ($\eta_{100°\,C.}$=5.3 mm$^2$/s); and
  682.4 g of ethylene-propylene copolymer
    [72% ethylene; $\overline{M}_w$=70,000; U=0.74;
    SSI (1% in mineral oil)=17].

After dissolution at 100° C. over an 8-hour period, the following mixture is added:
  320.4 g of the methacrylic acid ester of a $C_{12}$-$C_{18}$ alcohol mixture;
  35.6 g of dimethylaminoethyl methacrylate; and
  3.1 g of tert.-butyl peroctoate.
The following mixture is then added at 85° C. over a period of 3.5 hours:
  1112 g of the methacrylic acid ester of $C_{12}$-$C_{18}$ alcohol mixture;
  124 g of 2-dimethylaminoethyl methacrylate; and
  5.6 g of tert.-butyl peroctoate.
Two hours after the end of the addition, a further quantity of 3.2 g of tert.-butyl peroctoate is added. Total polymerization time: 10 hours.
  Polymer content of the emulsion=47.4% by weight.
  Viscosity (100° C., 47.4%)=11,000 mm$^2$/s
  Viscosity (100° C., 10%* in mineral oil of $\eta_{100°\,C.}$=5.3 mm$^2$/s)=21.72 mm$^2$/s
  SSI (5%* in mineral oil)=21.

EXAMPLE 10

The apparatus and mode of operation were the same as in Example 1, except that a 5-liter four-necked flask was used. Initial mixture:
  1450.7 g of mineral oil ($\eta_{100°\,C.}$=5.3 mm$^2$/s); and
  161.2 g of ethylene-propylene copolymer
    [72% ethylene; $\overline{M}_w$=100,000; U=0.9;
    SSI (1% in mineral oil)=23].
After dissolution at 100° C. for 8 hours, the following mixture is added:
  179.1 g of the methacrylic acid ester of a $C_{12}$-$C_{18}$ alcohol mixture;
  7.14 g of tert.-butyl peroctoate; and
  3.98 g of dodecyl mercaptan
Thereupon the following mixture is added at 98° C. over a period of 3.5 hours:
  1809 g of the methacrylic acid ester of a $C_{12}$-$C_{18}$ alcohol mixture; and
  30.7 g. of tert.-butyl peroctoate.
Two hours after the end of the addition a further quantity of 4 g of tert.-butyl peroctoate is added. Polymerization time: 10 hours.
This is followed by the addition of:
  695 g of ethylene-propylene copolymer
    [72% ethylene, $M_w$=100,000, U=0.9;
    SSI (1% in mineral oil): 23].
After dissolution at 100° C. over an 8-hour period, the following mixture is added:
  84 g of N-vinyl pyrrolidone;
  28 g of N-vinyl imidazole; and
  7 g of tert.-butyl perbenzoate.
The grafting is carried out at 130° C., with an additional 3.4 g of tert.-butyl perbenzoate added after 1 hour and 2 hours, respectively. A turbid, viscous emulsion is obtained.
  Polymer content=65.5% by weight.
  Viscosity (100° C., 65.5%)=16,250 mm$^2$/s
  Viscosity (100° C., 3.5%* in mineral oil of $\eta_{100°\,C.}$=5.3 mm$^2$/s)=12.6 mm$^2$/s
  SSI (3.5%* in mineral oil)=30.
After dilution of the 65.5% emulsion with dibutyl phthalate to a polymer content of 60%:
  Viscosity (100° C., 60%)=7,200 mm$^2$/s.

Despite the great increase in polymer concentration from 40 to 60%, the viscosity of the emulsion has increased from 3800 mm$^2$/s to only 7200 mm$^2$/s (cf. Example 1). This is attributable to the fact that less mineral oil is present and, hence, the dispersed OCP is present in a still smaller condition of swelling.

EXAMPLE 11

The apparatus and procedure are as in Example 1.
The initial charge comprises:
861 g of mineral oil ($\eta_{100° C.}=5.3$ mm$^2$/s);
95.7 g of ethylene-propylene copolymer
[72% ethylene; $\overline{M}_w=100,000$; U=0.8;
SSI (1% in mineral oil)=22];
89.3 g of the methacrylic acid ester of a $C_{12}$-$C_{18}$ alcohol mixture;
17 g of butyl acrylate; and
0.64 g of tert.-butyl peroctoate.

After the components are dissolved, the following mixture is added at a temperature of 90° C.:
367.5 g of the methacrylic acid ester of a $C_{12}$-$C_{18}$ alcohol mixture;
70 g of butyl acrylate; and
2.64 g of tert.-butyl peroctoate.

After these additions, one additional gram of tert.-butyl peroctoate is added.

After polymerization is concluded, the following are added:
26.6 g of N-vinyl pyrrolidone; and
1.7 g of tert.-butyl perbenzoate.

Grafting then follows at 130° C., during which a further 0.8 g of tert.-butyl perbenzoate is added after one hour and again after two hours. The total grafting time is six hours.

Thereafter, the following is added:
153 g of ethylene-propylene copolymer
[50% ethylene; $\overline{M}_w=95,000$; U=0.8;
SSI (1% in mineral oil)=25].

The material is dissolved at 100° C. and, after eight hours, a turbid, viscous emulsions is obtained.

Polymer content of the emulsion=48.7% by weight
Viscosity (100° C., 48.7% by weight)=8,000 mm$^2$/s
Viscosity (100° C., 10%* in mineral oil of $\eta_{100° C.}=5.3$ mm$^2$/s)=22.0 mm$^2$/s
SSI (10%* in mineral oil of $\eta_{100° C.}=5.3$ mm$^2$/s)=26
Nitrogen content of the isolated polymer=0.24% by weight.

What is claimed is:

1. A concentrated polymer emulsion useful as a lubricating oil additive for improving the viscosity index thereof, said emulsion comprising:
   (1) a dispersed phase of an olefinic copolymer having a molecular weight complementary with respect to the thickening effect desired;
   (2) a dispersing phase of a polymer predominantly comprising at least one member selected from the group consisting of acrylate ester and methacrylate ester monomers;
   (3) a vehicle which is a good solvent for the esters in said dispersing phase and a substantially less good solvent for the olefinic copolymer by virtue of the esters dissolved in said vehicle; and
   (4) an emulsifier, stabilizing phase distribution, which is a member selected from the group consisting of graft copolymers and block copolymers formed from olefinic monomers and at least one member selected from the group consisting of acrylate ester and methacrylate ester monomers.

2. A concentrated polymer emulsion as in claim 1 wherein the total polymer content is greater than 20 percent by weight of the emulsion.

3. A concentrated polymer emulsion as in claim 1 wherein the total polymer content is greater than 30 percent by weight of the emulsion.

4. A concentrated polymer emulsion as in claim 1 wherein said dispersing phase (2) is a polymer having a weight average molcular weight from 50,000 to 250,000.

5. A concentrated polymer emulsion as in claim 1 wherein said dispersing phase (2) is a polymer having a weight average molecular weight from 60,000 to 120,000.

6. A concentrated polymer emulsion as in claim 1 wherein said dispersed phase (1) is a copolymer having a weight average molecular weight greater than 50,000.

7. A concentrated polymer emulsion as in claim 1 wherein said dispersed phase (1) is a copolymer having a weight average molecular weight from 70,000 to 150,000.

8. A concentrated polymer emulsion as in claim 1 wherein said dispersing phase (2) is from 95 to 40 percent, and said dispersed phase (1) is from 5 to 60 percent, by weight of the total polymer present in said emulsion.

9. A concentrated polymer emulsion as in claim 1 wherein said vehicle (3) is capable of dissolving only less than 5 percent by weight of the dispersed olefinic copolymer (1).

10. A concentrated polymer emulsion as in claim 1 wherein said vehicle (3) is capable of dissolving only less than 2 percent by weight of the dispersed olefinic copolymer (1).

11. A concentrated polymer emulsion as in claim 1, wherein said vehicle (3) principally comprises mineral oil.

* * * * *